(12) United States Patent
Ahmed et al.

(10) Patent No.: US 9,245,271 B1
(45) Date of Patent: Jan. 26, 2016

(54) TAG SCORING FOR ELEMENTS ASSOCIATED WITH A COMMON TAG

(75) Inventors: Waqas Ahmed, Bellevue, WA (US); Scott Allen Mongrain, Seattle, WA (US); Aaron D. Wilson, Seattle, WA (US); Alexander J. Cox, Seattle, WA (US); Russell A. Dicker, Seattle, WA (US); Florin V. Manolache, Falticeni (RO)

(73) Assignee: Amazon Technologies, Inc., Seattle, WA (US)

( * ) Notice: Subject to any disclaimer, the term of this patent is extended or adjusted under 35 U.S.C. 154(b) by 2187 days.

(21) Appl. No.: 11/750,782

(22) Filed: May 18, 2007

(51) Int. Cl.
   G06Q 30/00 (2012.01)
   G06Q 30/06 (2012.01)
   G06F 17/30 (2006.01)

(52) U.S. Cl.
   CPC ............ *G06Q 30/00* (2013.01); *G06Q 30/0631* (2013.01); *G06F 17/30* (2013.01)

(58) Field of Classification Search
   USPC ...................................................... 705/26, 27
   IPC ........................................................ G06Q 30/00
   See application file for complete search history.

(56) References Cited

U.S. PATENT DOCUMENTS

| | | | |
|---|---|---|---|
| 7,693,906 B1 * | 4/2010 | Amidon et al. | 707/749 |
| 2006/0242139 A1 * | 10/2006 | Butterfield et al. | 707/5 |
| 2008/0082565 A1 * | 4/2008 | Chang et al. | 707/102 |
| 2008/0091549 A1 * | 4/2008 | Chang et al. | 705/26 |
| 2008/0162304 A1 * | 7/2008 | Ourega | 705/27 |
| 2008/0201348 A1 * | 8/2008 | Edmonds et al. | 707/101 |

OTHER PUBLICATIONS

Merriam-Webster's Collegiate Dictionary 10th Edition 1993, pp. 523-524, 4pgs.*
Gordon-Murnane, Laura: "Social bookmarking, folksonomies, and Web 2.0 tools: how do we find information that can help us do our jobs, pursue our interests and hobbies, or answer any other needs we may have? How do we keep track of information that we have already found, vetted, and deemed useful?" Searcher Jun. 2006 v14i, PQDialog #146693738, 31pgs.*

* cited by examiner

*Primary Examiner* — Rob Pond
(74) *Attorney, Agent, or Firm* — Lee & Hayes, PLLC

(57) ABSTRACT

Tag scoring for elements associated with a common tag enables a user to conduct a tag search and view a listing of elements associated with the tag. The listing can be ordered by each element's tag score. To create such a tag score, users may associate an element with one or more tags that characterize the element. A tag score may then be assigned to this element for each assigned tag and may be based on a multitude of factors. These factors may include a number of times that the element has been tagged with the assigned tag and users' votes on the accuracy of the assigned tag to the element. Tag-scoring factors may include, among others, an age of a tag associated with the element, a click rate for the element, a customer review of the element, a sales rank for the element, or an availability of the element.

8 Claims, 8 Drawing Sheets

TAG SCORING FOR ELEMENTS ASSOCIATED WITH A COMMON TAG

BACKGROUND

Unlike traditional brick-and-mortar businesses, companies utilizing e-commerce websites often do not have a physical store or location where a salesperson can help both novice and knowledgeable customers find sought-after products. Instead, a customer navigating an e-commerce website typically attempts to identify a product that meets the customer's needs. Even a customer with considerable experience navigating e-commerce websites sometimes experiences difficulty in locating a desired product from among hundreds or thousands of offered products. For novice customers, meanwhile, the task of shopping online via the web can be unproductive and even frustrating.

In response to these difficulties, these companies continually strive to make their e-commerce websites more dynamic, compelling, and easier for users to navigate and locate products. To help meet these goals, one recent innovation allows customers to search for a product by tags associated with that product. Tags essentially enable customers, the e-commerce company, or some other entity the ability to easily categorize products. For instance, a customer who has purchased a certain fitness-related book may tag this book as relating to "fitness". When other customers then conduct a future tag search based on "fitness", this book will appear in a returned listing of products.

Unfortunately, products returned to customers in response to tag searches might be presented or listed in a haphazard fashion. That is, if a customer searches for products associated with a tag entitled "fitness", a most desirable product may appear near the end of the returned list, while a less desirable product may appear nearer the beginning of the list. Therefore, while the tag search effectively narrows the number of products for the customer to peruse, a tag search might not allow for efficient inspection of the returned list of products.

Accordingly, among other potential improvements, there remains a need for improving navigation of e-commerce websites and the ability for users to locate desired products.

SUMMARY

According to some embodiments, tag scoring for elements associated with a common tag enables a user to conduct a tag search based on the common tag and view a listing of elements associated with the tag that is ordered by each element's respective tag score. Due to this ordering, the user may efficiently and effectively peruse the listing of elements. To create such a tag score, users or other entities may initially associate an element with one or more particular tags that characterize the element. A tag score, which may be based on a multitude of factors, may then be assigned to this element for each assigned tag. These factors may include, for instance, a number of times that the element has been tagged with the particular tag. These factors may also include users' votes on the accuracy or relevance of the particular tag as it associates with the element. Other tag-scoring factors may include an age of a tag associated with the element, a click rate for the element, a quality score or customer review of the element, a sales rank for the element, or an availability of the element, among others.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 7 illustrates that the item listing page may remove the user's ability to vote once the user has voted on the accuracy or relevance of the tag for the associated item.

DETAILED DESCRIPTION

Figure 1:
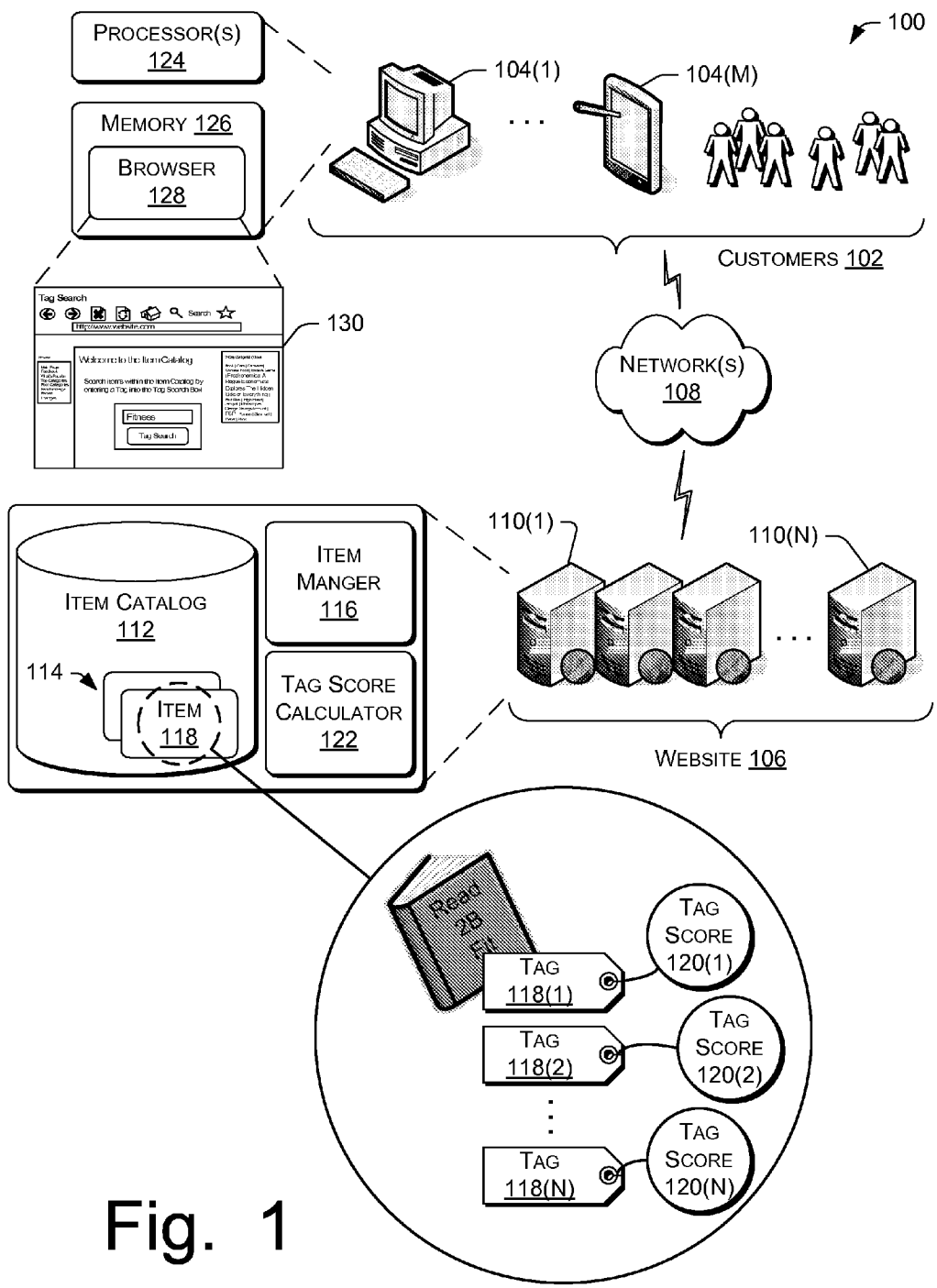
FIG. 1 illustrates an exemplary architecture for implementing tag scoring for items within an electronic catalog. The network environment includes multiple clients coupled via a network to a server system that hosts the electronic catalog.

Embodiments of the present disclosure are directed to, among others, tag scoring for elements associated with a particular tag and made available over the Internet. As an overview, elements may be a product, a service, a sellable unit, a user profile, customer-created content (e.g., artwork), or anything else to which a tag may be associated. Tagging, meanwhile, enables a community of users or other entities to define and assign different tags to the elements. Tags are user-generated metadata about the elements. In other words, tags are pieces of information separate from, but related to, the elements. In a collaborative environment, the tags are descriptors that may be freely chosen by different users to characterize or otherwise describe attributes of the elements, rather than having the description controlled by a centralized classification process. With this freedom, the tags can specify properties of an element that may not otherwise be obvious from the element itself and/or which may have special meaning only to the user or a subset of users. Once assigned to elements, the tags may then be used to locate the elements via a tag search. Although embodiments are described as having alpha-numeric tags, other types of tags can be used, including icons, photos, and/or video clips.

Thus, in some implementations, a user may discover one or more elements within an electronic catalog and associated with a particular tag by conducting a tag search for that tag. In response to the search, in some embodiments elements associated with the tag are arranged based on, in whole or in part, a tag score. For example, in some embodiments, a list of elements associated with the tag may be presented to the user in an order determined by at least a tag score of each element. Each tag score may be determined, in whole or in part, based on the element and the particular tag associated with the element. As a result of ordering the list of elements based on tag scores, the list presents to the user elements with higher tag scores near the beginning or top of the list and elements with lower tag scores near the end or bottom of the list. These tag scores thus enable the "best" or "most relevant" elements associated with a particular tag to be presented to the user at the top of the list. With such an ordered list, the user may easily and effectively navigate the elements. Although this illustrative embodiment refers to the use of lists, other arrangements of the elements that depict a relative prominence of the elements based on the tag score can be used. For example, the elements may be arranged in a cloud or other grouping with elements having higher tag scores being shown in increasing fonts, boldness, or contrasting color.

Although some embodiments may depict an ordering of items based on the tag score, some embodiments may order the items using another criteria (e.g. alphabetical, price, etc.). In such embodiments, a representation of tag scores associated with various items can be depicted with the items to assist the user in determining relevance of the tag to the item.

For purposes of discussion, tag scoring is described in the context of an item catalog hosted by a merchant website. One exemplary implementation of this environment is provided below. However, it should be appreciated that the described tag scoring techniques may be implemented in other environments.

Exemplary System Architecture

FIG. 1 illustrates an exemplary architecture 100 in which tag scoring may be implemented. In architecture 100, customers 102 may utilize user computing devices 104(1), . . . , 104(M) to access a website 106 via a network 108. Network 108 represents any one or combination of multiple different types of networks, such as cable networks, the Internet, and wireless networks.

One or more servers 110(1), . . . , 110(N), perhaps arranged in a cluster or as a server farm, host website 106. Other server architectures may also be used to host the site. Website 106 is capable of handling requests from many users and serving, in response, various web pages that can be rendered at user computing devices 104(1)-(M). Website 106 can be any type of website that supports user interaction, including online retailers, informational sites, social networking sites, blog sites, search engine sites, news and entertainment sites, and so forth.

In the exemplary environment, website 106 represents a merchant website that hosts an electronic catalog with one or more items. An item includes anything that the merchant wishes to offer for purchase, rental, subscription, viewing or some other form of consumption. In some embodiments the item may be offered for consumption by the merchant. However, in some embodiments the merchant may host items that others are selling using the merchant's website. An item can include a product, a service, a digital download, a news clip, customer-created content, information, or some other type of sellable or non-sellable unit.

In FIG. 1, the electronic catalog is represented as an item catalog 112, which stores a collection of item records 114. Item catalog 112 is accessible, directly or indirectly, by one or more of servers 110(1)-(N). Each item record 114, meanwhile, represents an associated item being offered for sale on website 106 and contains information about the associated item. For products such as books or music CDs, for example, the item record may contain a description, images of the product, author/artist names, publication data, pricing, shipping information, and so forth. For other types of items, the item record may contain different information appropriate for those items.

An item manager 116 facilitates access to and management of item records 114 in item catalog 112. Item manager 116 allows the website operators to add or remove items to item catalog 112, and generally maintain control of the items offered on website 106. When a user requests information on an item from website 106, one or more of servers 110(1)-(N) retrieve the item information from item catalog 112 and serve a web page containing the information to the requesting user computing device. Item catalog 112 may therefore contain static web pages that are pre-generated and stored prior to such requests, or may alternatively store data that is used to populate dynamic web pages that are generated in response to such requests.

In addition, each item record 114 within item catalog 112 may be associated with one or more tags. For instance, an item record 118 (illustrated as representing a book) is shown to be associated with tags 118(1), . . . , (N). Customers 102, an operator of website 106, or some other entity may have associated tags 118(1)-(N) with item record 118. By associating a tag with an item record, the tag also becomes associated with the item that the item record represents. As discussed above, tags 118(1)-(N) may comprise pieces of information that characterize or otherwise describe attributes of the item represented by item record 118. In some embodiments, tags may also include information that do not describe attributes of the item. For example, a user may tag an item "Mom" to indicate items that might be a good gift for the user's mother.

Each of tags 118(1)-(N) may itself include or otherwise correspond to a respective one of tag scores 120(1), . . . , (N). Tag scores 120(1)-(N) may comprise a score for an item as it relates to an associated tag and may be based on a multitude of factors. Some of the factors that assist in creating these tag scores may be based on user interaction with the tags, while other factors may not so rely on user interaction. Whatever factors lead to their compilation, each of tag scores 120(1)-(N) may be helpful in response to a user's tag search for respective tags 118(1)-(N). For instance, if a user searches within the item catalog for item records associated with tag 118(1) (e.g. "fitness"), tag score 120(1) may dictate where on the returned list of items item record 118 will appear. If, for instance, item record 118 has a relatively high tag score 120(1) associated with tag 118(1), then item record 118 may appear nearer the beginning or top of the list relative to other listed items. Conversely, if item record 118 has a relatively low tag score 120(1) associated with tag 118(1), then item record 118 may appear nearer the end or bottom of the list. FIGS. 2-8 and the accompanying discussion illustrate an example of tag scoring, tag searching, and the presentation of items associated with the exemplary tag.

Note again, however, that tag scores may be utilized to present other arrangements of the elements. These other arrangements may or may depict a relative prominence of the elements based on the corresponding tag scores. Conversely, the arrangements may merely indicate the elements and the elements' corresponding tag scores in any grouping or order.

FIG. 1 also depicts a tag score calculator 122, which calculates tag scores 120(1)-(N) for tags 118(1)-(N) associated with item record 118. Tag score calculator 122 also calculates tag scores for each tag associated with each item record 114 within item catalog 112. To calculate tag scores, tag score calculator 122 may utilize many factors, either individually or in any combination, some of which may indicate the relevance of a tag associated with a respective item.

As discussed above, one or more of customers 102 may search for items associated with a particular tag (e.g., tag 118(1)) by conducting a tag search on website 106. To search, customers 102 may utilize user computing devices 104(1)-(M) (also referred to as "client computers" or simply "clients"). User computing devices 104(1)-(M) may be implemented as any number of computing devices, including as a personal computer, a laptop computer, a portable digital assistant (PDA), a mobile phone, a set-top box, a game console, and so forth. As illustrated, each user computing device is equipped with one or more processors 124 and memory 126 to store applications and data. According to some embodiments, a browser application 128 is shown stored in memory 126 and executes on a processor 124 to provide access to website 106. Browser 128 renders web pages served by website 106 on an associated display. Although embodiments are described in the context of a web based system, other types of client/server based communications and associated application logic could be used.

When a user (e.g., one of customers 102) accesses website 106, user computing device 104(1) submits a request, such as in the form of a uniform resource locator (URL), to servers 110(1)-(N). Upon receiving the request, servers 110(1)-(N) return a web page 130 back to the requesting client computer. In the context of a merchant website, returned web page 130 may allow for the user to enter a particular tag (e.g., "fitness") into a search box to search for items associated with that particular tag. In response to this search, another web page may display a listing of items associated with the particular tag. In some instances, an order of the list may be based on each item's corresponding tag score as discussed in detail below.

In addition to a user conducting a tag search via browser 128, other software applications (browsers or otherwise) could likewise conduct a tag search. These searches may or may not be in response to a user command. For instance, a user could search for a particular tag via a first website, which could itself crawl one or more other websites. The first website may then receive a listing of items associated with the particular tag from the one or more other websites. In addition or in the alternative, a software application may itself conduct the tag search in order to receive and store the listing as data for use in an array of computations.

Tag Scoring

Figure 2:
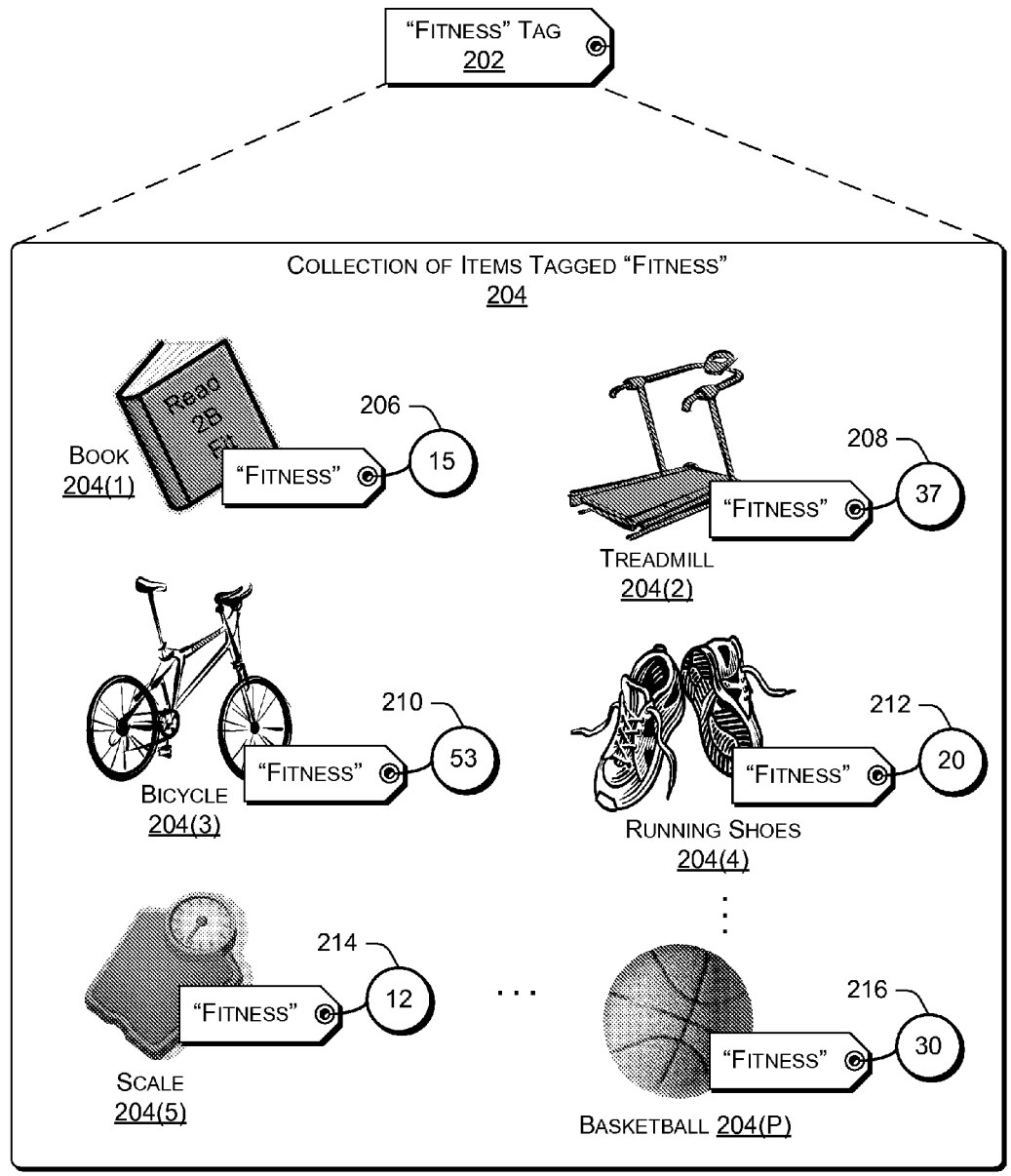
FIG. 2 illustrates an exemplary implementation of a particular tag having multiple associated items, each item having a tag score for that particular tag.

While FIG. 1 illustrates that single item record 118 may associate with multiple tags 118(1)-(N), FIG. 2 similarly illustrates that a single tag may correspond to multiple item records. FIG. 2 therefore illustrates that a tag 202 named "fitness" corresponds to a collection 204 of items tagged fitness. This correspondence represents that one or more of customers 102, the website operator, or some other entity has previously tagged each of item records 204(1), . . . , (P) with fitness tag 202. As discussed above and as illustrated, item records may represent any item that may be sold or otherwise listed on website 106. Exemplary item records associated with fitness tag 202 include a book 204(1), a treadmill 204(2), a bicycle 204(3), running shoes 204(4), a scale 204(5), and a basketball 204(P). Although illustrated as a single tag 202 that is associated with different item records, in some embodiments, different tag entries having the same tag (e.g. "Fitness") could be maintained.

Also as illustrated, each of item records 204(1)-(P) includes or otherwise corresponds to a respective tag score 206, 208, . . . , 216 for fitness tag 202. In some instances, these tag scores indicate something about the associated item or may indicate a relevancy between the item and the tag. For instance, a highest tag score may serve to represent that a corresponding item is the "best" or "most relevant" item. Of course, a highest tag score may also represent multiple other characteristics about the corresponding item. In addition, while these tag scores are illustrated as integers, these scores may also be represented in a plurality of other ways. For instance, these tag scores may represent each item record's score relative to an item record with a highest tag score. For instance, each tag score could be shown with use of bar graphs. Also note that while this discussion describes tag scores as being "higher" or "lower", these terms merely illustrate tag scores for an item record relative to other item records similarly tagged.

As discussed above, the illustrated tag scores may determine an order of in which item records 204(1)-(P) may be presented in response to a tag search for "fitness" tag 202. In some implementations, a returned list of items begins with an item record having a highest score and thereafter lists item records according to decreasing tag score. By so listing item records 204(1)-(P), a customer may easily navigate or peruse the "best" or "most relevant" item record for fitness tag 202 in some implementations.

A number of factors may influence or otherwise determine tag score values. In addition, one or more of these factors may serve as a tiebreaker when determining which of two identically-scored item records to list first. Some of these factors may be based on user interaction, while other factors may not. One user-interaction-based factor that may influence a tag score is a number of times that an item record has been tagged with that particular tag. For instance, if many of customers 102 have tagged bicycle 204(3) with fitness tag 202, then corresponding tag score 210 (or a portion thereof) may be higher relative to other item records that have not received as many fitness tags.

A perceived relevance of a tag as applied to a particular tagged item record may also determine all or a portion of a tag score. For instance, one or more of customers 102 may vote to voice their opinion as to the tag's relevance. When a customer votes that a tag aptly describes the item that the item record represents, then a corresponding tag score may increase. Conversely, if a customer votes that a tag correlates poorly, then the corresponding tag score may decrease.

Figure 6:
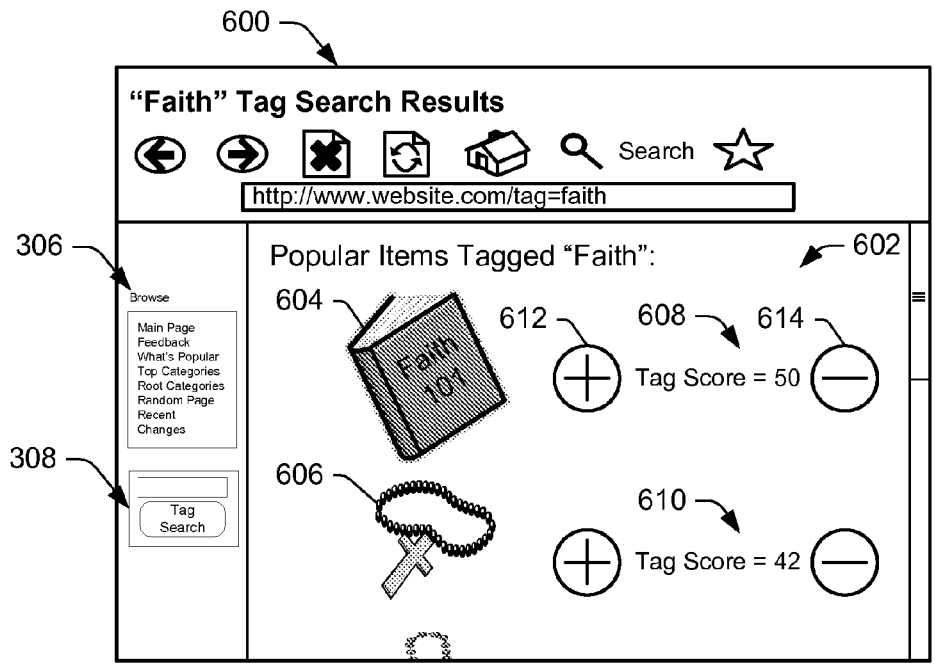
FIG. 6 illustrates a screen rendering of another exemplary item listing page that lists items associated with a particular tag in an order determined by the items' tag scores. Through the item listing page, a user may vote on an accuracy or relevance of a tag for an associated item.
Figure 7:
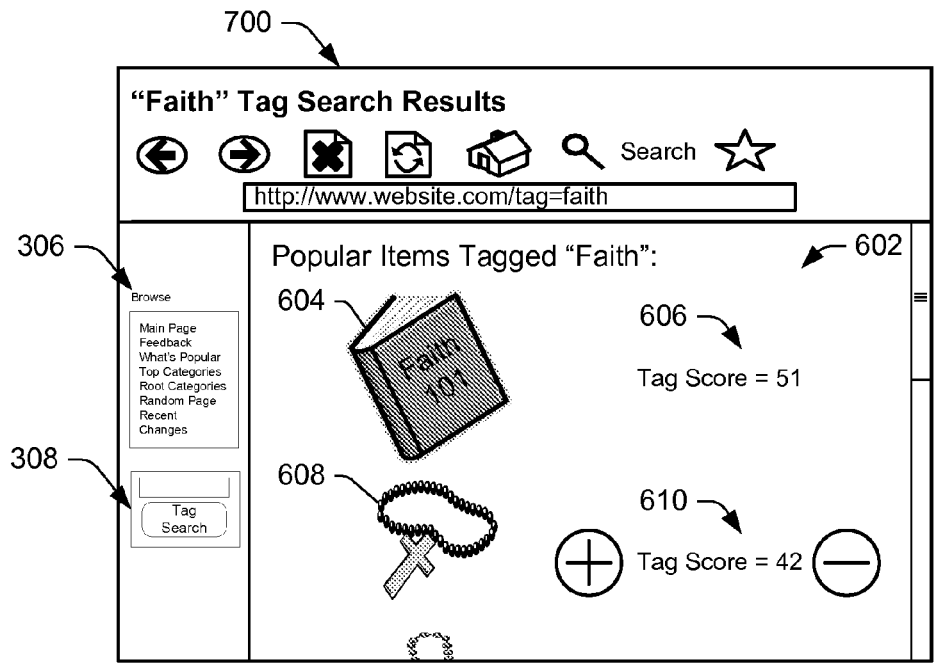
FIG. 7 illustrates another screen rendering of the exemplary item listing page of FIG. 6.

For instance if a customer places a vote stating that fitness tag 202 relates or aptly describes bicycle 204(3), then corresponding tag score 210 may increase. Conversely, if the customer places a vote stating that fitness tag 202 poorly describes bicycle 204(3), then tag score 210 may decrease. In some implementations, one type of vote may be weighted greater than the opposite type of vote. For example, a negative vote may influence tag score 210 more than a positive vote. Some implementations may require that, in order for a customer's vote to influence a tag score, the voting customer have either purchased something from the merchant's website or the particular item for which the vote is placed. FIGS. 6-7 and an accompanying discussion further illustrate this factor below.

An item's quality rating or customer review rating may also affect tag scores 120(1)-(N) and 206-216. If, for instance, bicycle 204(3) receives high-quality ratings or positive reviews from some of customers 102, then the bicycle's corresponding tag score 210 may increase. In addition, other tags associated with bicycle 204(3) may likewise increase. Therefore, when a customer searches for items associated with fitness tag 202, bicycle 204(3) may appear nearer the beginning of the returned list relative to other items tagged with fitness tag 202 that did not receive such a positive review.

Again, a poor rating or a negative review may likewise decrease a tag score. The review rating could be based on, for example, a star rating (e.g. 1-5 stars) or other objective or subjective rating systems that could be used to generate a numerical result.

Tag scores may also vary based on a click rate or count of corresponding item records. In instances where a great deal of customers 102 select a certain item record, a corresponding tag score may increase. A click rate or count may include a number of times that an item record's tag is searched, as well as a number of times that the item record is returned on a tag search. Note that a tag may be searched by typing the tag name into a search box, by selecting a tag hyperlink, or the like. Additionally, a click rate or count may include a number of times that a user directly chooses to view details about the item record (e.g., clicks on) in response to a tag search.

Like the other scoring factors discussed above and below, the corresponding tag score may either measure this factor absolutely or relatively. That is, a tag score may increase when a corresponding item record is selected or, conversely, the tag score may increase or decrease based on the item record's click rate relative to other item records similarly tagged. In these latter instances, an item record with a higher click rate or count may appear nearer the top of a returned tag-search list than another item record that has a lower click rate or count. To illustrate, tag score 210 may increase relative to tag score 212 if bicycle 204(3) exhibits a higher click rate than running shoes 204(4).

As mentioned above, some factors that influence tag scores may not be based on user interaction. Once such factor is an item's sales, or lack thereof. If, for instance, an item's sales rank is very high relative to other items tagged with a particular tag, then a corresponding tag score may be relatively high. Conversely, if this item's sales rank is low, then the corresponding tag score may be lower.

Tag scores may similarly vary based on an item's availability or an item's estimated time to ship. If the item is in short supply, is unavailable, or will take a relatively long time to ship to a purchasing customer, then the corresponding tag score may be lower. The converse may also be true in some implementations. To exemplify, imagine that the bicycle that item record 204(3) represents is out of stock, while other items corresponding to item records tagged "fitness" are readily available. Tag score 210 (or some portion thereof) corresponding to bicycle 204(3) may accordingly be lower than the tag scores corresponding to other item records that represent the readily available items.

Tag scores may also decrease based on tag aging in some implementations. For instance, if an item record has not been tagged with a particular tag for a predetermined amount of time, a corresponding tag score may decrease. This tag score may be assigned a half-life and may decrease (e.g., linearly, exponentially, among other possibilities) accordingly until the item record is retagged (once or a predetermined number of times) with the particular tag. Again, the corresponding tag score may also decrease based on the item record's rate of tagging relative to similarly-tagged item records. To illustrate, if bicycle 204(3) has not been tagged with fitness tag 202 for a predetermined amount of time, the tag score 210 may decrease, possibly exponentially according to a given half-life.

A tag score may also similarly decrease based on an age of the first particular tag tagged upon a corresponding item record. That is, a tag score may decrease with time, beginning at a time that the corresponding item record was first tagged with the particular tag. Such a declination helps ensure that newer products appear nearer the top of a returned item list, reflecting a truth that interest for older items often declines for some types of items. Tag score 210, for instance, may decline with time beginning at a time at which bicycle 204(3) was first tagged with fitness tag 202.

While a few exemplary factors have been listed above, multiple other factors may influence or otherwise determine tag scores such as tag scores 120(1)-(N) and 206-216. In addition, any combination of listed or non-listed factors may together determine tag scores. Each factor may be given equal or unequal weight when aggregating the factors to determine a tag score. Finally, the factors used may or may not be configurable by customers 102, by the operator of website 106, and/or by another entity.

To better illustrate the customer experience that tag scoring enables, FIGS. 3-8 show renderings of various web pages served by website 106. In this example, a user (e.g., one of customers 102) conducts a tag search for item records tagged "fitness". While this example discusses searching for tagged item records on a merchant website, it is noted that other formats and services may employ tag scoring to enhance user experience while searching for content.

Figure 3:
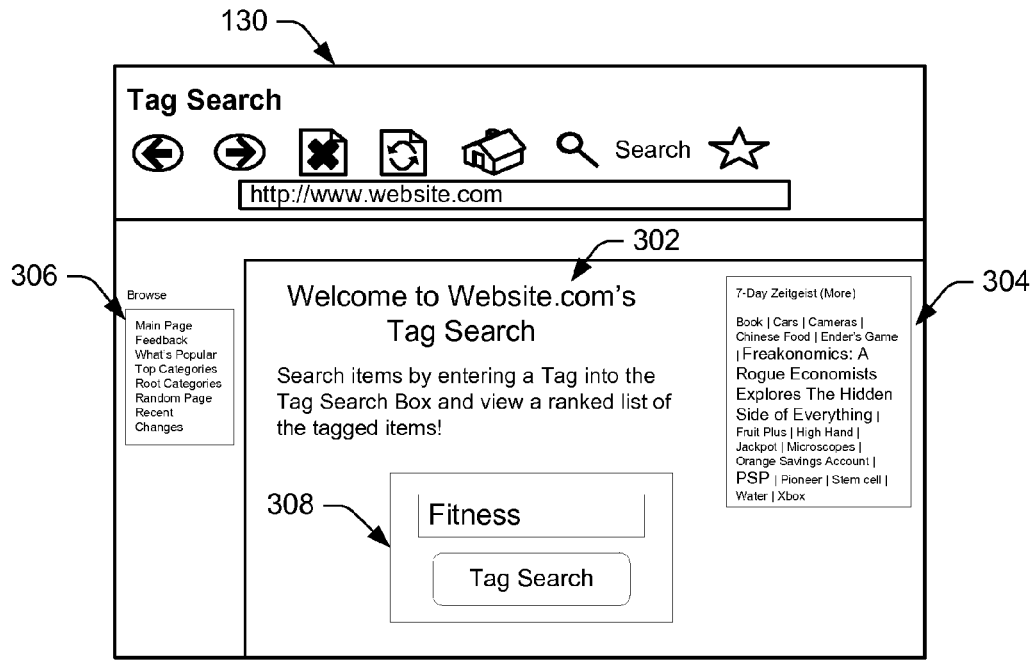
FIG. 3 illustrates a screen rendering of an exemplary tag search page for searching for items associated with a particular tag and viewing a listing of the items based on tag scores.

FIG. 3 shows web page 130 for conducting a tag search on a merchant website. Web page 130 includes a welcome pane 302 with a greeting. The home page might also contain other controls or navigation tools, such as a zeitgeist 304 listing the most popular or interesting tags over the past seven day period, a list of navigation links 306, and a tag search tool 308. Tag search tool 308 allows the user to search and locate item records within item catalog 112 and associated with a particular tag. In the illustrated example, the user conducts a tag search for the tag labeled "fitness".

Figure 4:
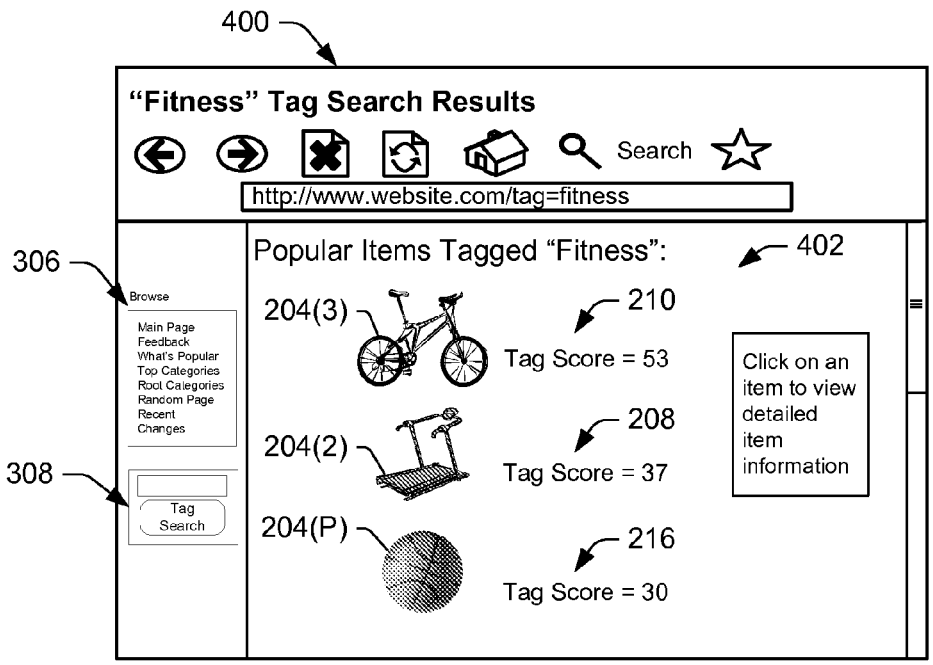
FIG. 4 illustrates a screen rendering of an exemplary item listing page that lists items associated with a particular tag in an order determined by the items' tag scores.

FIG. 4 shows a rendering of web page 400 served in response to a user's request for item records associated with fitness tag 202. As illustrated, Web page 400 includes a list 402 of item records 204(1)-(P). In this example, list 402 depicts these item records in reverse numerical order beginning with the item record having the highest fitness tag score. As such, FIG. 4 illustrates list 420 as beginning with bicycle 204(3) (having a tag score 210 of 53), followed by treadmill 204(2) (having a tag score 208 of 37), and basketball 204(P) (having a tag score 216 of 30). FIG. 4 also illustrates that a user may select (e.g., click on) one of the listed item records to view detailed information about, as well as other tags associated with, the selected item record as discussed below with regards to FIG. 8.

Figure 5:
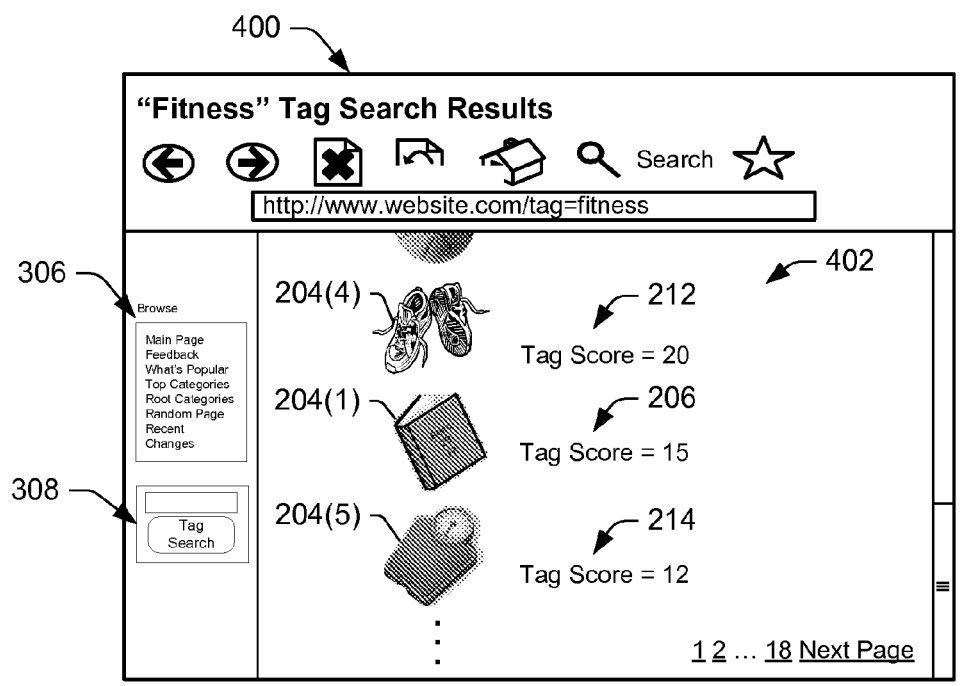
FIG. 5 illustrates another screen rendering of the exemplary item listing page of FIG. 4.

FIG. 5 continues the illustration of list 402. After basketball 204(P), list 402 depicts running shoes 204(4) (having a tag score 212 of 20), book 204(1) (having a tag score 206 of 15), and scale 204(5) (having a tag score 214 of 12). While list 402 is shown as listing each item record associated with fitness tag 202, list 402 may also list only a portion of these item records in some implementations. For instance, list 402 may instead only list those item records having a fitness tag score greater than a predetermined threshold (e.g., 25).

In addition, list 402 may be configurable by a user, the website operator, or some other entity. To exemplify, a user could choose to rank item records 204(1)-(P) according to one or more of the factors that create the tag score. For instance, a user may wish to configure list 402 to present item records 204(1)-(P) according to the item records' sales, votes, click rate, or the like.

As discussed above, users (e.g., customers 102) may vote on accuracy or relevance of a particular tag as it applies to a tagged item record. FIGS. 6-7 depict an exemplary implementation of this process. FIG. 6 shows an exemplary screen rendering of a web page 600 that includes a list 602 of item records having been tagged "faith". These item records include a book 604 and a necklace 606, having faith tag scores 608 and 610, respectively. In addition, list 602 shows a positive vote actuator 612 and a negative vote actuator 614 for tag score 608 of book 604. A user may utilize one of these actuators to express the user's opinion as to the relevance of the "faith" tag as applied to book 604. In some implementations, in order for the user's vote to be counted, the user must have purchased something from the merchant website generally, must have purchased an item in list 602, or must have purchased book 604. While FIGS. 6-7 depict actuators 612 and 614, other representations may also be used to allow a user to express the user's opinion as to the tag's relevance as applied to a certain item record. For instance, list 602 could show thumbs up/down actuators, upwards/downwards arrow actuators, or the like.

FIG. 7 depicts a screen rendering of a web page 700 after the user has voted on the relevance of the faith tag as applied to book 604. FIG. 7 shows that tag score 608, which corresponds to book 604, has increased from 50 to 51 in response to a positive vote by the user. As mentioned above, in some instances a negative vote may be given greater weight in calculating a corresponding tag score than a positive vote. In addition, note that a tag may be removed from an item if the item receives a certain predetermined threshold number of negative votes. A tag may also be removed if the tag score becomes lower than a predetermined minimum tag score.

In some implementations, each user may have a single vote on a tag's relevance to an item record. List 602 accordingly no longer shows actuators 612 and 614 for book 604. As such, this user may no longer cast a vote in regards to tag score 608. Notice that list 602 continues to show actuators for tag score 610, which corresponds to necklace 606. In some instances, however, a user may be limited to a single vote for each tagged-item listing, such as list 602.

Figure 8:
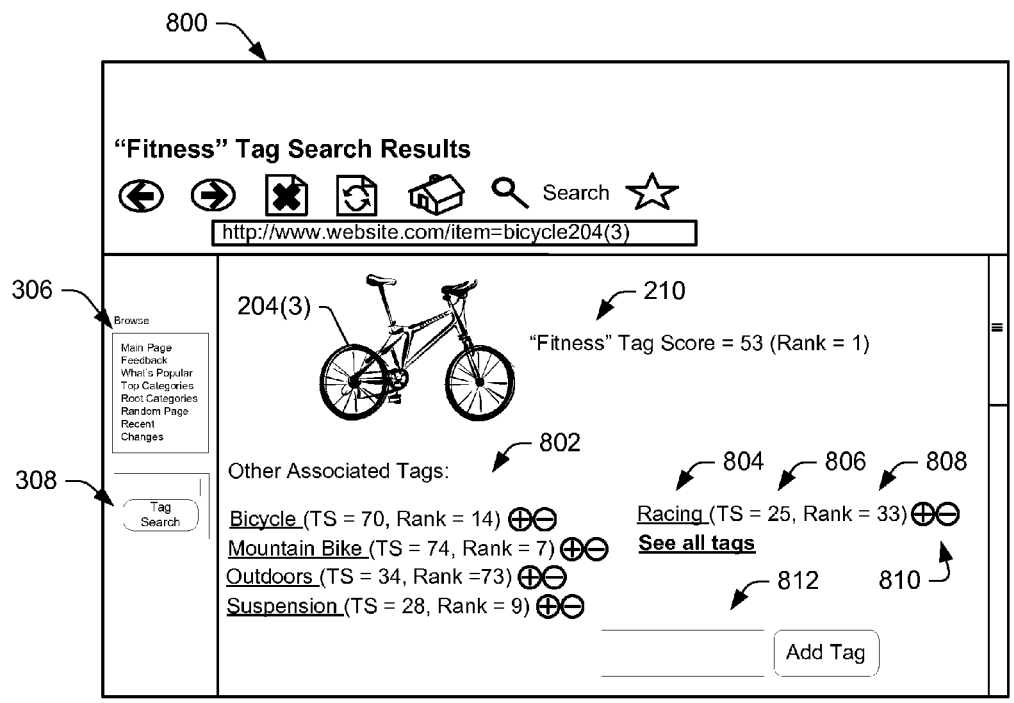
FIG. 8 illustrates a screen rendering of an exemplary item detail page, which depicts a listing of other tags associated with a particular item in response to a user selecting the particular item.

Also as discussed above in regards to FIG. 4, a user may select an item record to view detailed information about the associated item, as well as additional tags associated with the item record. FIG. 8 depicts such a web page 800 including detailed information about bicycle 204(3). While web page 800 continues to show fitness tag score 210, web page 800 also shows a tag rank and a list 802 of other tags for which bicycle 204(3) has been associated. For each tag, list 802 includes a tag name 804 as well as a tag score 806 as it relates to each particular tag and bicycle 204(3). Each additional tag may also include a tag rank 808 that depicts the elements rank within items associated with that particular tag. Finally, list 802 may also include actuators 810 to enable a user to vote on each tag's relevance to bicycle 204(3).

Finally, web page 800 is shown to include an "add tag" tool 812. With this tool, a user may choose to add a tag to bicycle 204(3). For instance, the user could choose to tag bicycle 204(3) as "thrilling", such that bicycle 204(3) will appear in a returned item listing when future users conduct a tag search for a tag entitled "thrilling". Of course, where the user tags bicycle 204(3) as "thrilling", a tag score may be computed for this "thrilling" tag as it relates to bicycle 204(3).

Item Manager and Tag Score Calculator Implementation

Figure 9:
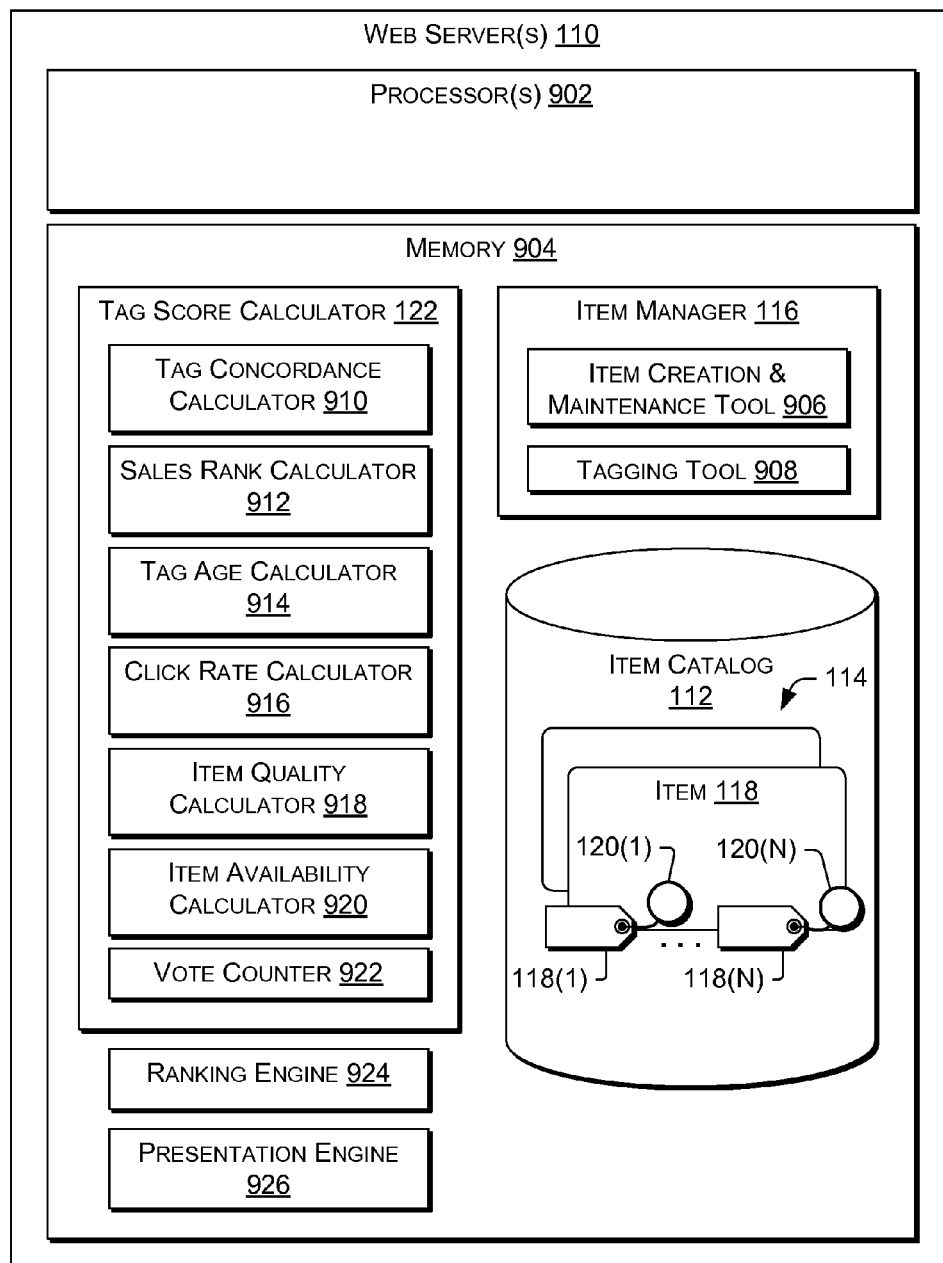
FIG. 9 is a block diagram illustrating embodiments of modules in an item manager and tag score calculator from FIG. 1.

FIG. 9 illustrates example implementations of item manager 116 and tag score calculator 122 that are run as software on one or more of web servers 110(1)-(N). The web servers have processing capabilities and memory suitable to store and execute computer-executable instructions. In this example, web server(s) 110 include one or more processors 902 and memory 904. Memory 904 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Item manager 116 and tag score calculator 122 are implemented as software or computer-executable instructions stored in memory 904 and executed by one or more processors 902. Item manager 116 includes an item creation and maintenance tool 906 to facilitate creation and maintenance of item records 114 in item catalog 112. Such items may be created and posted by the website operator (e.g., an owner of a merchant website), the manufacturer, distributor, retailer, or the like. Item manager 116 further includes a tagging tool 908 that enables a user to associate one or more tags with an item within item catalog 112. Tagging tool 908 may also enable the user to first define one or more of the tags.

Tag score calculator 122, meanwhile, is shown to include a multitude of modules. With use of one or more of the illustrated modules, or one or more non-illustrated modules, tag score calculator 122 calculates a tag score for a particular tag when it is associated with a particular item and item record. Tag score calculator 122 is first shown to include a tag concordance calculator 910. Tag concordance calculator 910 serves to monitor and store a number of times that a particular tag has been associated with a particular item record. Again, item records with a high tag concordance for a particular tag may have a relatively higher tag score for that tag.

Tag score calculator 122 also includes a sales rank calculator 912, a tag age calculator 914, and a click rate calculator 916. Sales rank calculator 912 serves to monitor and store sales data for items within item catalog 112. With this data, sales rank calculator 912 may calculate a relative sales rank for a particular item, which tag score calculator 122 may utilize in calculating one or more tag scores for the item. Tag age calculator 914, meanwhile, may track tag ages, which may also be utilized in calculating tag scores as discussed above. Likewise, click rate calculator 916 tracks a click rate or a click count for item records, which again may be used to calculate tag scores.

FIG. 9 also illustrates an item quality calculator 918, an item availability calculator 920, and a vote counter 922. Item quality calculator 918 may receive or calculate quality ratings or customer reviews for items within item catalog 112 and may store this information for use in tag score calculation. As discussed above, higher ratings or better reviews may increase a particular item record's tag scores, while lower ones may generally decrease these scores. Item availability calculator 920, meanwhile, may maintain current information about items' availability, such that items with little or no availability are not listed at the beginning of a returned tag-search list. Finally, vote counter 922 tracks the positive and negative votes discussed above for each tag as it associates with a particular item. These votes may influence calculated tag scores in the manner discussed above.

In addition to the item manager and tag score calculator, memory 904 is shown to include a ranking engine 924 and a presentation engine 926. Ranking engine 924 receives, from tag score calculator 122, calculated tag scores for item records associated with a particular tag and ranks the item records in accordance with the assigned tag scores. With reference to FIG. 2 for instance, ranking engine 924 could receive each of tag scores 206-216 and rank item records 204(1)-(P) according to these scores. This ranking may begin with the item record having the highest tag score and may thereafter rank item records according to decreasing tag scores.

Presentation engine 926 then receives the ranking of the item records and, in response, presents the item records to the user in the ranked order. Depending on how the item records have been ranked, presentation engine 926 could present these item records in the manner illustrated by FIG. 4-5 or in some other manner. That is, presentation engine 926 could present these item records via web page 400 or in some other format.

Operation

Figure 10:
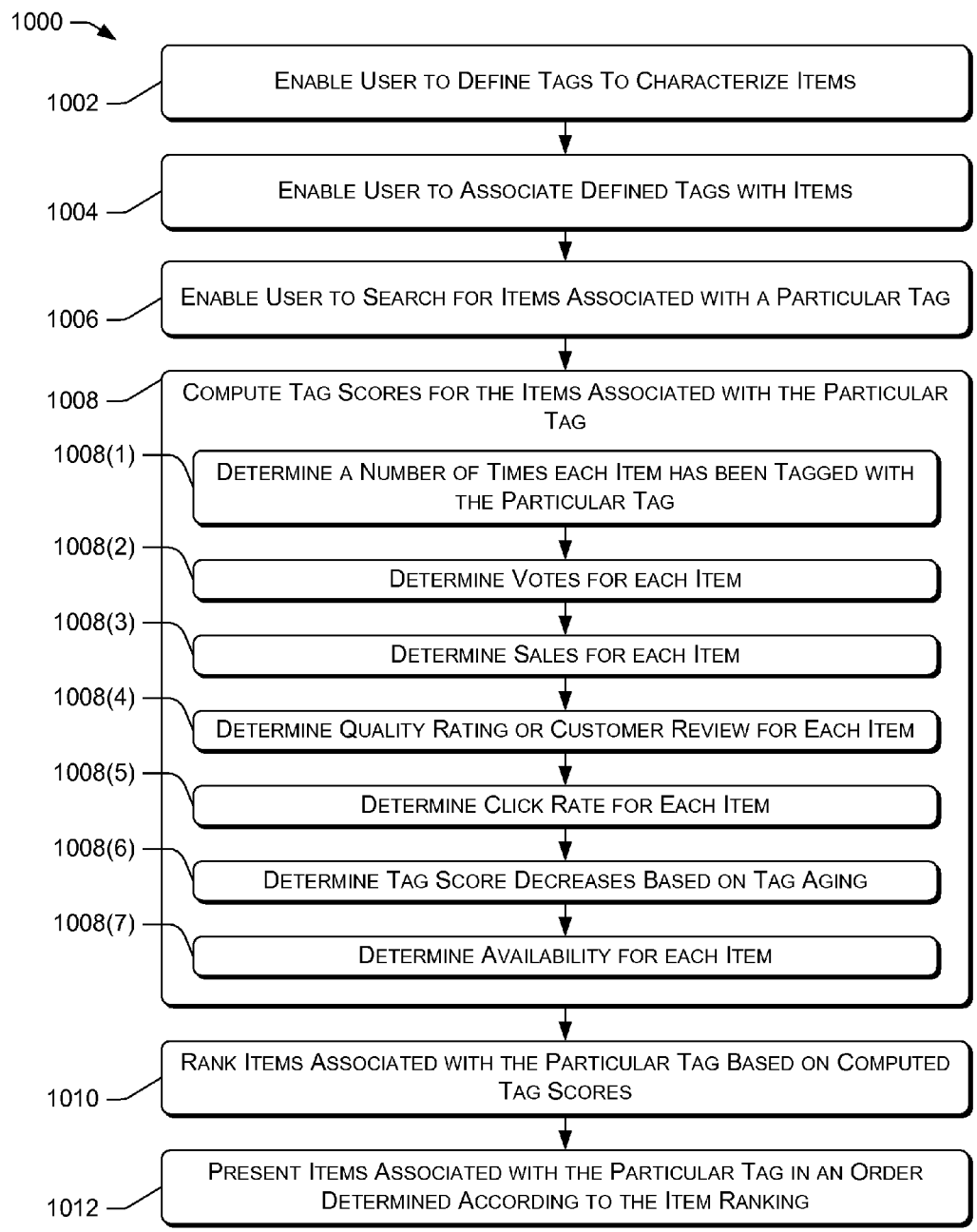
FIG. 10 is a flow diagram of an embodiment of a process for tagging items with a particular tag and computing tag scores for the tagged items.

FIG. 10 illustrates an exemplary process 1000 for tagging items with a particular tag and computing tag scores for the tagged items. Process 1000 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, process 1000 is described with reference to architecture 100 of FIG. 1, as well as item manager 116 and tag score calculator 122 of FIGS. 1 and 9. In particular, many acts described below may be implemented and performed by tag score calculator 122 illustrated in FIGS. 1 and 9, and particularly subcomponents of tag score calculator 122 shown in FIG. 9.

Process 1000 includes operation 1002, which enables a user (e.g., one of customers 102) to define one or more tags to characterize one or more items in an item catalog. Tagging tool 908 may help accomplish this operation. Operation 1004 represents enabling the user to associate defined tags with items in the item catalog. Again, tagging tool 908 may assist the user in this association operation. At operation 1006, the user may search for items that are associated with a particular tag. The exemplary screen rendering of FIG. 3 may be useful in conducting such a tag search.

Next, FIG. 10 shows that operation 1008 computes tag scores for the items associated with the particular tag, and includes a series of sub-operations 1008(1), . . . , (7). Sub-operation 1008(1) determines a number of times that each item has been tagged with the particular tag. Again, a higher concordance of tags may serve to increase a corresponding tag score. Sub-operation 1008(2), meanwhile, determines (e.g., tallies) votes for each item. These votes may voice a voter's opinion as to whether the particular tag corresponds well with the tagged item. Positive votes may increase a tag score, while negative votes may decrease the score.

Sales for each item associated with the particular tag may then be determined at sub-operation 1008(3). Sales may be calculated absolutely or relative to other items tagged with the particular tag. In some instances, higher sales likely means a higher corresponding tag score. Sub-operation 1008(4) determines (e.g., receives) quality ratings or customer review for each item. Similar to sales, higher ratings and better reviews likely result in a higher tag score. Sub-operation 1008(5), meanwhile, represents determining a click rate or count for each item associated with the particular tag. Tag scores typically rise with increased click rates or counts.

Sub-operation 1008(6) determines potential tag score decreases based on tag aging. Again, tag scores may decrease with time beginning at a time at which the item was first tagged with the particular tag. Tag scores may also decrease based on an amount of time since the item was last tagged with the particular tag. Finally, sub-operation 1008(7) determines availability or the like for each item. While operation 1008 has been described with reference to the series of sub-operations 1008(1)-(7), operation 1008 may include more or less than sub-operations than those illustrated.

With use of tag scores computed by operation 1008, operation 1010 may rank the items associated with the particular tag. Operation 1012 then presents the items associated with the particular tag in an order determined according to the item ranking of operation 1010. By presenting the items to the user in this manner, the "best" or "most relevant" items may be shown to the user at the top of the list in some implementations. The user may therefore efficiently and effectively peruse the items associated with the particular tag before deciding whether or not to purchase one or more of the items.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    associating, at a computing device, a plurality of elements with a particular tag, the plurality of elements being different from one another;
    receiving, at the computing device, a quality rating for each element of the plurality of elements;
    receiving information regarding a number of times that an element of the plurality of elements has been associated by the computing device and other computing devices with the particular tag;
    computing, at the computing device, based at least in part on the quality ratings of the plurality of elements and the received information, a tag score for each element of the plurality of elements associated with the particular tag, the tag score for each element indicating a relevance of the particular tag to the element;
    computing, at the computing device, for each element of the plurality of elements,
        a rank value for the element with respect to other elements of the plurality of elements associated with the particular tag, the rank value computed based at least in part on the tag scores computed for the elements associated with the particular tag; and
    in response to a request for the particular tag at the first website, causing display for each element of the plurality of elements associated with the particular tag:
        information regarding the element;
        the tag score computed for the element, the tag score indicating the relevance of the particular tag to the element; and
        the rank value computed for the element,
    wherein one of the elements of the plurality of elements associated with the particular tag is received from one or more second websites in response to the first website initiating a web crawl of the one or more second websites.

2. A method as recited in claim 1, wherein at least one element associated with the particular tag comprises an item for sale in an electronic catalog.

3. A method as recited in claim 1, wherein at least one element associated with the particular tag comprises customer-created content.

4. A method as recited in claim 1, wherein the particular tag describes a characteristic of the elements associated with the particular tag.

5. A method as recited in claim 1, wherein a user of a merchant website associates at least some of the elements with the particular tag.

6. A method as recited in claim 1, wherein a user defines the particular tag, the particular tag describing an attribute of at least one element of the plurality of elements.

7. A server system comprising:
- a memory configured to at least store specific computer-executable instructions; and
- one or more processors in communication with the memory, the one or more processors configured to execute the specific computer-executable instructions to at least:
- for each item of a plurality of items in an item catalog,
  associate a particular tag with the item, the particular tag characterizing the item;
- receive information based on a number of times that the item has been associated with the particular tag;
- calculate a tag score for the particular tag associated with the item, the tag score indicating a relevance of the particular tag to the item, the tag score calculated based at least in part on an availability to ship the item and the received information;
- generate a rank value for the item with respect to other items in the item catalog that are associated with the particular tag, the rank value for the item generated based on respective tag scores for the other items in the item catalog;
- receive a query for a tag based on a request received at a first website from a computing device;
- retrieve at least one other item associated with the tag located at one or more second websites in response to the first website initiating a web crawl of the one or more second websites; and
- cause presentation of a respective tag score for the tag associated with the at least one other item and a respective rank value for the at least one other item.

8. A server system as recited in claim 7, wherein the items in the item catalog are offered for sale on a merchant website.

* * * * *